United States Patent Office 3,533,977
Patented Oct. 13, 1970

3,533,977
ORGANIC SOLVENT COMPOSITION FOR TEX-
TILES AND PROCESS FOR ITS APPLICATION
Robert Emms Read, Newark, Del., assignor to E. I. du
Pont de Nemours and Company, Wilmington, Del.,
a corporation of Delaware
No Drawing. Continuation-in-part of application Ser. No.
389,777, Aug. 14, 1964. This application July 12, 1967,
Ser. No. 652,728
Int. Cl. C08f *29/22, 45/52;* C08g *37/32*
U.S. Cl. 260—28.5                           5 Claims

ABSTRACT OF THE DISCLOSURE

An organic solvent containing composition useful for application to fibrous substrates such as textiles and leather to obtain water and oil repellency. In particular, an organic solvent solution containing in specific proportions, a fluorinated polymer, a melamine derivative, and/or a nonfluorinated polymer. It is applied to textiles by standard techniques such as spraying, dipping or curtain coating.

CROSS-REFERENCES TO RELATED APPLICATIONS

This application is a continuation-in-part of copending application Ser. No. 389,777, filed Aug. 14, 1964 and now abandoned.

BACKGROUND OF THE INVENTION

Field of the invention

An organic solvent containing composition useful for application to fibrous substrates such as textiles and leather to obtain water and oil repellency.

Description of the prior art

Application of fluorinated polymer compositions from aqueous emulsion systems to textiles to obtain oil- and water-repellent coatings is well known in the art. For example, an aqueous dispersion of fluorinated and nonfluorinated polymers gives excellent results, when applied to textiles, as an oil- and water-repellent coating. For a number of reasons, however, compositions which do not use water as an application medium are desirable. A number of fabrics or structural surfaces, i.e., cellular polystyrenes or glass, puffed fabrics, embossed paper, leather and the like are either themselves sensitive to water or contain sizes such as starch, gelatin, casein or polyethylene oxide, dyes and other such agents which are sensitive to water. Certain puffed or matelassé fabrics are not readily treated with aqueous systems because squeezing is generally required to remove the excess water; such fabrics cannot tolerate this treatment.

For these reasons, it is desirable to provide non-aqueous compositions for rendering substrates oil and water repellent. However, it was found that when known oil and water repellent compositions were employed from non-aqueous solutions, the treated fabrics either had poor repellency or quickly lost their repellent porperties after cleaning.

The compositions of this invention overcome the foregoing deficiencies.

SUMMARY OF THE INVENTION

The present invention is directed to novel compositions which comprise (I) from 0.5 to 50% by weight of solids comprising
 (A) from 5% to 97% by weight based on total weight of solids of a fluorinated copolymer comprising (a) from about 25% to about 99% of monomers of the structure $R_fCH_2CH_2O_2CC(CH_3)=CH_2$ wherein $R_f$ is a perfluoroalkyl group of from four to fourteen carbons;
 (b) from 0.1% to about 20% by weight of at least one monomer selected from

 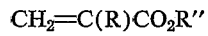

wherein R is H or methyl, R′ is alkylene of at least two carbons (preferably 2–6 carbons), and R″ is epoxy alkyl of at least three carbons (preferably 3–6 carbons); and
 (c) at least one vinylidene monomer free of nonvinylic fluorine different from said monomers of said (b) in an amount sufficient to make 100% by weight;
 (B) from 0% to 75% of a melamine formaldehyde condensation product; or from 3% to 75% when component (C) is not present;
 (C) from 0% to 75% of at least one nonfluorinated extender polymer selected from (1) copolymers of long chain alkyl methacrylates and dialkylaminoalkyl methacrylates, (2) chlorosulfonated hydrocarbon polymers, (3) polyurethanes containing free isocyanate groups, and (4) copolymers containing the group

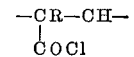

R being H or methyl; or from 3% to 75% when component (B) is not present; and
(II) from 50% to 99.5% based on weight of total composition of an organic solvent chosen from hydrocarbons, halogenated hydrocarbons, ketones and esters having a boiling point of from about 25° C. to 180° C.; said polymers of paragraphs (A) and (C) and said melamine derivative of paragraph (B) each being soluble or dispersible in said organic solvent to the extent of from 0.03% to 20% by weight based on weight solvent. Optionallly, up to 50% of a wax based on total solids may be present. The total of the components of said components (A), (B), (C) and wax, when all are present, is 100% and the sum of components (B) and (C) when present together is at least 3%.

The present invention also encompasses a novel process for rendering a substrate oil and water repellent which comprises applying the novel composition described above to said substrate. Preferably, the treated substrate is heated to a temperature of no greater than 180° C. after application of said organic solvent. Another embodiment comprises applying the organic solvent composition as an aerosol. Still another embodiment comprises carrying out the process without application of pressure to the substrate.

DESCRIPTION OF THE INVENTION

Treating agents for rendering fabrics and other substrates oil and water repellent which are sensitive to water for the reasons mentioned previously must have a combination of properties to be useful. Since water cannot be used, an inert organic solvent must be used as the vehicle for applying the agents to the substrate. The agents must therefore be either soluble or dispersible in the organic solvent. The agents must further be able to wet the surface of the substrate preferably at reasonably low temperatures in order to spread thereon during curing to form a reasonably continuous coating. To obtain durability, the agents must be compatible with fugitive surfaces which often occur on certain textiles and other substrates such as starch, gelatin, casein and ethylene oxide polymers. For durable coatings it is necessary that these agents will react with the fugitive surfaces to become insoluble.

Most of the substrates with which this invention is concerned require flexibility; it is, therefore, necessary that the treating agents also be flexible. It is also necessary that the treating agents be resistant to abrasion and that they be nontacky so that dust and the like will not adhere easily. The agents must also be oil and water repellent in addition to having the above properties.

The composition of the present invention contains the following essential ingredients: (1) the fluorine-containing copolymer, (2) at least one of the melamine formaldehyde condensation products, and/or (3) the nonfluorinated extender polymer, and (4) the organic solvent. Based on total weight of solids, the concentration of fluorinated polymer is from about 5% to about 97%, the concentration of melamine derivative from 0% to about 75%, and the extender polymer from about 0% to about 75%, with the understanding that at least one of the melamine formaldehyde condensation products and the extender polymer must be present in at least 3% concentration. The mixture of solids contains at least 3% by weight fluorine. This combination is dissolved in an organic solvent to form a solution containing from 0.5% to 50% by weight solids. This composition is applied to textiles by any means known to the art which avoids the use of squeeze rolls and the like, particularly when treating pile or puffed fabrics and other squeeze-sensitive materials. The use of squeeze rolls is permissible with non-sensitive substrates.

The fluorine-containing copolymers used in the present invention consist of from about 25% to about 99% by weight of monomers of structure $$R_fCH_2CH_2O_2CC(CH_3)=CH_2$$

from about 0.1% to about 20% of at least one of the monomers chosen from $CH_2=C(R)CO_2R'OH$, $$CH_2=C(R)CONHCH_2OH$$

and $CH_2=C(R)CO_2R''$ wherein R is H or methyl, R' is an alkylene group containing at least two carbons and R'' is an epoxy group containing at least three carbons. The copolymers may also contain at least one vinylidene monomer to be hereinafter described which is free of nonvinylic fluorine and which is different from the monomers named above. In these polymers $R_f$ is a perfluoroalkyl group containing from four to fourteen carbons which may be either straight or branched chain. $R_f$ may also contain perfluorocycloalkyl groups or perfluorocycloalkyl groups substituted with perfluoroalkyl groups. The straight chain perfluoroalkyl groups $F(CF_2)_n$ where $n$ is from six to about ten are preferred.

By vinylidene monomer is meant a monomer which contain the polymerizable group $CH_2=C<$. In particular, these monomers include alkyl acrylates and methacrylates; styrene and alkyl styrene; vinyl alkyl ketones; vinyl alkyl ethers, vinyl esters of aliphatic acids, butadiene and substituted butadienes.

Representative examples of these vinylidene monomers include: methyl acrylate and methacrylate; propyl acrylate and methacrylate; butyl acrylate and methacrylate; iso-amyl acrylate and methacrylate; 2-ethylhexyl acrylate and methacrylate; octyl acrylate and methacrylate; octadecyl acrylate and methacrylate; lauryl acrylate and methacrylate; cetyl acrylate and methacrylate; N,N-diethylaminoethyl acrylate and methacrylate; vinyl acetate, vinyl propionate, vinyl caprylate, vinyl laurate and vinyl stearate; styrene, α-methylstyrene, p-methylstyrene, vinyl methyl ketone, vinyl ethyl ketone, vinyl methyl ether, vinyl ethyl ether, 1,3-butadiene, 2-chloro-1,3-butadiene, 2,3-dichloro-1,3-butadiene and isoprene.

The nonfluorinated extender polymer is chosen from (1) copolymers of long chain alkyl methacrylates and dialkylaminoalkyl methacrylates as described in British Pat. 915,759; (2) chlorosulfonated hydrocarbon polymers as disclosed in U.S. Pat. 2,586,363, (3) certain polyurethanes of low molecular weight containing free isocyanate groups as disclosed in U.S. Pat. 2,929,800 or (4) copolymers of vinylidene monomers containing the group

A specific example is the terpolymer of ethylene, vinyl acetate and methacrylyl chloride. These extender polymers are essentially free of fluorine. These polymers must be prepared in such a manner that they remain soluble or dispersible in the solvent medium.

To be useful in the present invention, it is necessary that the fluoropolymer and extender polymer crosslink or become insoluble during curing. Both the fluoropolymer and extender polymer or melamine formaldehyde condensation product should interact with either each other, or the substrate during curing to form insoluble coatings. The extender polymers containing chlorosulfonyl groups, and the polymers of ethylene, vinyl acetate and methacrylyl chloride react in solution. It is necessary, therefore, to combine the constituent shortly before use as the crosslinking reaction must take place only during curing and not prior to use.

It is preferred that the reactive groups contained in either the fluorinated or extender polymer should be relatively unreactive at lower temperatures with the melamine derivatives or each other. The particularly useful groups for this purpose are epoxy-alkyl groups, dialkylaminoalkyl groups, hydroxyalkyl groups, chlorosulfonyl groups and free isocyanate groups. The epoxyalkyl groups are usually obtained by incorporation in the fluorinated polymer of small amounts of a polymerizable ester of glycidyl alcohol. Hydroxyalkyl groups are incorporated in the fluorinated polymer in the form of either polymerizable monoesters of glycols or polymerizable hydroxymethylamides. Such monomers include hydroxyalkyl acrylates and methacrylates; hydroxyalkyl acrylamides and methacrylamides or epoxyalkyl acrylates and methacrylates, specifically N-methylolacrylamide, N-methylol methacrylamide, hydroxyethyl acrylates and methacrylate; hydroxypropyl acrylate and methacrylate, and glycidyl acrylates and glycidyl methacrylates. The preferred extender polymer containing dialkylaminoalkyl methacrylates is the copolymer of 70% stearyl methacrylate and 30% diethylaminoethyl methacrylate, described in Example 1 of British Pat. 915,759. Other polymers of this patent may also be used.

The condensation products of melamine with formaldehyde in general may contain either hydroxymethyl or alkoxymethyl groups attached to the melamine amino nitrogens. They may further contain reaction products of the above with high molecular weight acids and products derived from such acid derivatives by reaction with alkanolamines or the like. The melamine formaldehyde condensation products are well known in the art and are described in the following U.S. Pats: 2,398,569; 2,454,495; 2,529,856; 2,783,231; 2,835,639; and 2,864,781.

To be used in the present invention, the fluorinated polymers, the extender polymers and/or the melamine formaldehyde condensation products must each be soluble or dispersible in the organic solvents to the extent of at least 0.03% by weight. Materials having lower solubility are not useful due to the impossibility of obtaining useful concentrations for treating fabrics, i.e., 0.5% by weight of total solids in solution. Solvents which may be used in the present invention include hydrocarbons, halogenated hydrocarbons, ketones and esters having boiling points of 25° C. to 180° C. The solvents of choice are in general the halogenated hydrocarbons and in particular, compounds such as trichloroethylene, tetrachloroethylene, 1,1,2-trichlorotrifluoroethane, and 1,2-difluorotetrachloroethane. Other useful solvents include benzene, Stoddard solvent, xylene, benzotrifluoride, hexafluoroxylene and the like. This latter group of solvents is less desirable due to either their flammability, toxicity, or expense. The preferred solvents and trichloroethylene, 1,2 - difluorotetrachloroethane, 1,1,2 - trichlorotrifluoroethane and particularly mixtures of all three. For aerosol application solvents such as trichloromonofluoromethane, mixtures of trichloromonofluoromethane and dichlorodifluoromethane or mixtures of trichloromonofluromethane and dichlorodifluoromethane with either trichlorotrifluoroethane or vinyl chloride. Ketone solvents which may be used include acetone and methylethyl ketone. Esters such as ethyl acetate; amyl acetate or the like may be used in some cases. Since many regenerated or synthetic fibers are sensitive to ketone and ester solvents as are many sizes, etc. with which textiles are treated, care should be used in choosing these solvents.

The lower limit of solvent concentration is based on solubility of the solids in the solvent. Generally, at least 50% by weight solvent is desirable in the composition. Since at least 0.5% of solids is required in the composition, the upper solvent concentration is 99.5% by weight.

It has been found that it is desirable, although not necessary, to add a wax to the present compositions to enhance the water repellency obtained on textiles. The fluorinated polymers themselves are water repellent. Addition of the wax, however, increases the water repellency of the composition at less expense than is required to obtain an equivalent water repellency using the fluorinated polymer alone. Up to 50% by weight based on total solids of the wax may be used if desired. The wax must be soluble to the desired amount in the organic solvent, should be solid at room temperature, and have a melting point of less than 180° C. Any naturally occurring or synthetic wax meeting these requirements may be used but paraffin wax is preferred.

The preferred composition of the present invention consists of 16% by weight solids and 84% by weight solvents. The solids consist of (a) 38% fluorinated polymer containing 76% by weight $R_fCH_2CH_2O_2CC(CH_3)=CH_2$ where $R_f$ is a mixture of $C_6F_{13}$, $C_8F_{17}$ and $C_{10}F_{21}$ in the weight ratio 3:2:1, 19% butyl methacrylate and 5% glycidyl methacrylate;
(b) 27% melamine derivative prepared by reacting one mole of hexamethoxymethyl melamine with two moles behenic acid;
(c) 15% paraffin wax, and
(d) 20% of either chlorosulfonated polyethylene or polyurethane rubber copolymer.

The solvent mixture consists of 100 parts trichloroethylene, 50 parts trichlorotrifluoroethane, and 8 parts tetrachlorodifluoroethane. When used in spray applications, this composition is diluted with trichloroethylene to a concentration of 0.5 to 1% total solids content.

The preparation of the fluoromonomers $$R_fCH_2CH_2O_2CC(CH_3)=CH_2$$

useful in this invention is described in French Pat. 1,356,923 and in U.S. Pat. 3,282,905. The fluorinated polymer may be prepared by either solution or emulsion polymerization techniques. It is necessary to control and limit the molecular weight of this polymer to maintain solubility in the useful organic solvents. In general, the molecular weight is controlled by either using relatively high concentrations of polymerization initiators or by the use of chain transfer agents. In solution polymerizations, the solvent itself may be a reasonably good chain transfer agent. Such solvents include hydrocarbons, aliphatic alcohols and ketones and certain halogenated aliphatic compounds.

In general, the compositions of this invention may be prepared by any of the known techniques for emulsion polymerization of vinyl compounds. The process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include 2,2'-azodiisobutyramidine dihydrochloride, 2,2'-azodiisobutyronitrile, 2,2' - azobis(2,4 - dimethyl - 4-methoxyvaleronitrile), sodium peroxide, barium peroxide, hydrogen peroxide, ammonium persulfate, potassium persulfate, and the like. The concentration of the catalyst for the polymerization usually is between 0.1% and 2% based on the weight of the monomers. The surface active agents employed to stabilize the emulsion during its makeup and polymerization are anionic, cationic, or non-ionic emulsifying agents, but preferably they are the cationic or non-ionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium α-H-polyfluoroalkanoate ($C_8$ to $C_{10}$), and ammonium perfluoroalkanoate. The cationic agents that may be employed include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride, N-[2-(diethylamino)ethyl]-oleamide hydrochloride. Nonionic surface active agents that may be employed include condensation products of ethylene oxide with hexylphenyl, isooctylphenyl, hexadecanol, oleic acid, alkane ($C_{12}$–$C_{16}$) thiol, alkyl ($C_{12}$–$C_{18}$) amines and the like.

The polymer resulting from the emulsion polymerization is isolated by coagulation filtration or the like and dissolved in the organic solvent or in some cases may be extracted directly from the emulsion into the organic solvent.

The compositions of this invention may be prepared also by solution polymerization techniques which are well known in the art. The chosen monomers and the initiators are dissolved in the solvent in a reaction vessel fitted with a stirrer and means of either heating or cooling the charge. Concentrations of the monomer and solution may vary from 5–50%. The reaction temperature is raised to between 40–100° C. to effect polymerization. When polymerization is complete, the resulting solution is usually used directly to prepare the compositions of this invention by merely dissolving therein the other components. Useful initiators for solution polymerization are peroxide and azo compounds which are soluble in the organic solvent. These include an acyl peroxide such as benzoyl peroxide and lauroyl peroxide, organic peresters such as tertiary butyl perbenzoate, dialkyl peroxides such as ditertiarybutyl peroxide and organic azo compounds such as azobis(isobutyronitrile) and azobis(2,4 - dimethylvaleronitrile) and known related compounds. The concentration of initiators will usually range from about 0.1% to about 2% based on the weight of monomers. If the solvent itself or other conditions are insufficient to properly control molecular weight, small amounts of chain transfer agents such as alkanethiols with 4–12 carbons may be added. The preferred solvents for the solution polymerization of the fluorinated monomers are trichlorotrifluoroethane and tetrachlorodifluoroethane.

The fluorinated polymers prepared from $$CH_2=C(R)CO_2R'OH, CH_2=C(R)CONHCH_2OH$$

or $CH_2=C(R)CO_2R''$, as previously described, are prepared by either of the same emulsion or solution techniques as described for the fluorinated polymers above. The extender polymers containing chlorosulfonyl groups are prepared by chlorosulfonating polyethylene as described in U.S. Pat. 2,586,363. The useful polyurethanes are prepared by reacting together a polyol and a di- or tri-isocyanate to obtain polymers described in U.S. Pat. 2,929,800. The stearyl methacrylate diethylaminoethyl methacrylate copolymers are prepared as described in British Pat. 915,759, Example 1.

In preparing the compositions of this invention, the fluorinated polymer, melamine derivative, extender polymer, and the optional wax, if used, are dissolved in the desired solvent to obtain solutions of the desired concentration. Ordinary methods for preparing solutions are used. Normally, for purposes of transport, more concentrated solutions are prepared which are diluted to the working concentrations of 0.5 to 1% by addition of further solvent before application.

Suitable substrates for the application of the compositions of this invention are films, fibers, yarns, fabrics, and articles made from filaments, fibers or yarns derived from natural, modified natural, or synthetic polymeric materials or from blends of these other fibrous materials and other porous materials which absorb and transport low surface tension liquids either on their surfaces or in their interstices by capillary action. Specific representative examples are cotton, silk, regenerated cellulose, nylon, fiber-forming linear polyesters, fiber-forming polyacrylonitrile, cellulose nitrate, cellulose acetate, ethyl cellulose, leather, paper, fiber glass, wood pressed or otherwise hardened wood composites, metals, unglazed porcelain, porous concrete and the like. Dyed and undyed cotton sateen, poplin, broadcloth, jean cloth, gabardine and the like, are desirable for treatment with the compositions of this invention to provide products having a high repellency to oil and water and being relatively unaffected by the action of heat, air, and light. The compositions of this invention are particularly useful for applying to puffed fabrics, leather, cellular polystyrene, embossed paper and the like, which do not tolerate the use of pressure rolls or squeeze rolls and to fabrics which contain water soluble sizes, fillers or water sensitive dyes and other adjuvants. The materials rendered oil and water repellent by the composition of this invention retain a major portion of the original water repellency when laundered or dry cleaned.

The compositions of this invention are applied as organic solvent solutions by brushing, dipping, spraying or padding onto the fabric. After application, the solvent is allowed to evaporate. Usually sufficient solution is applied to provide a dry pickup of from 0.1% to 10% by weight, and preferably 0.5 to 1%, of total solids on the fabric based on the weight of fabric. The dry pickup is adjusted to provide the equivalent of at least 0.03% and preferably 0.2% to 0.3% by weight of the fluorinated monomer on the fabric. Lesser amounts give poor results in oil and water repellency. More than 10% may be applied but there is little economic incentive to do so since oil and water repellencies are not improved thereby.

After evaporation, the solvent-treated fabric is heated to cure the polymer coating at 80–180° C. for at least 10 seconds. Generally, curing of about 60 seconds is preferred. Curing may be carried out by any means available for heating fabric which does not require application of pressure to the fabric. Generally, ovens are used. In the absence of curing, initial repellency is usually satisfactory. However, durability to washing and to dry cleaning is low and usually unsatisfactory. In the case of use of the epoxide containing fluoropolymers together with the chlorosulfonated polyethylene extender, or of use of methyl acrylamide—fluoromethacrylate copolymers with the acryloylchloride extenders, thermal curing after application is optional. On curing, satisfactory durability to washing and to dry cleaning is immediately developed. However, in the absence of curing, appreciable albeit lower durability develops within 2–3 weeks at ambient temperatures. Application to highly sized fabric requires curing to develop appreciable durability.

For certain purposes, such as reapplication in the home where commercial application equipment is not available, application of the compositions of this invention as an aerosol formulation is desirable. Aersols may be applied without special equipment or technique merely by spraying on the desired area. Aerosol application gives only fair repellency and durability initially since no cure is used. After standing for a few weeks the repellency and durability increase to optimum limits. The aerosol formulations are prepared by combining the composition with an aerosol propellent such as dichlorodifluoromethane, monofluorotrichloromethane, dichlorotetrafluoroethane, mixtures such as mixtures of dichlorodifluoromethane and monofluorotrichloromethane or dichlorodifluoromethane and dichlorotetrafluoroethane. Mixtures of any of these chlorofluorocarbons with vinyl chloride may also be used. Sufficient propellent to propel the entire contents of the aerosol container is used, say up to equal weights.

The following representative examples illustrate the practice of the present invention. These examples are for illustrative purposes only and are not intended to limit the scope of this invention. All parts are by weight unless specifically set out otherwise.

EXAMPLE 1

This example illustrates the general method for solution polymerization in preparation of fluorinated polymers utilized in the practice of this invention.

A mixture of 192.0 parts perfluoroalkyl methacrylate of structure $F(CF_2)_nCH_2CH_2O_2C(CH_3)=CH_2$ wherein $n=6, 8$ and $10$ in the weight ratio 3:2:1 and containing trace amounts of $n=12$ and 14, 48.0 parts n-butylmethacrylate and 12.0 parts glycidyl methacrylate was dissolved in a mixture of 75 parts of 1,1,2-trichlorotrifluoroethane and 240 parts 1,2-difluorotetrachloroethane. The solution was purged for one hour with nitrogen then heated to reflux under a blanket of nitrogen. A total of 0.60 part $\alpha,\alpha'$-azobis(isobutyronitrile) was added with agitation at 74° C. to the solution in two equal portions with an interval of three hours between additions. The reaction mixture was heated a total of 12 hours at 74° C. The solvent was then removed from the reaction mixture by evaporation under reduced pressure and the resulting solid polymer isolated. The polymer had an inherent viscosity of 0.54 at 30° C. as a ½% solution in 1,1,2-trichlorotrifluoroethane.

*Analysis.*—C, 40.2; H, 3.6; F, 45.0. Calculated for a polymer of the same composition as the ratio of monomer charged, i.e., 76.2% perfluoroalkyl methacrylate, 19% butylmethacrylate and 4.8% glycidyl methacrylate· C, 39.3; H, 3.5; F, 45.6.

Inherent viscosity determined according to the formula:

$$n_i = \frac{1}{C} \ln\left[\frac{n}{n_0}\right]$$

wherein $n_i$ is the inherent viscosity, $n$ is the measured viscosity of the 0.5% solution, $n_0$ is the measured viscosity of the pure solvent and C is the concentration of polymer in g./100 ml. of solution.

EXAMPLES 2–10

Using the procedure of Example 1, the polymerizations shown in Table I (which follows) were carried out. In each case the monomer or monomers were dissolved in the indicated solvents. The indicated initiator was added and the reaction mixture was heated for the indicated length of time. The polymers were isolated as before.

TABLE I.—CONDITIONS

| Ex. No. | Fluoromonomer,(a) parts | Comonomer A,(b) parts | Comonomer B,(b) parts | Initiator, (c) parts | Solvent,(d) parts | Temp., °C. | Time, hrs. |
|---|---|---|---|---|---|---|---|
| 2 | 192 | BMA, 48 | GMA, 12 | IBN, 0.6 | BF, 240; TF, 75 | 74 | 12 |
| 3 | 192 | BMA, 48 | GMA, 12 | IBN, 0.6 | BF, 240; TF, 75 | 74 | 12 |
| 4 | 64 | BMA, 16 | | IBN, 0.2 | BF, 81; TF, 63 | 74 | 15 |
| 5 | 53 | BMA, 5 | MAM, 1 | IBN, 0.2 | TF, 300 | 47 | 20 |
| 6 | 53.1 | BMA, 5.0 | HPMA, 1.3 | IBN, 0.2 | TF, 300 | 47 | 18 |
| 7 | 128 | GMA, 6.4 | | IBN, 0.2 | BF, 160; TF, 50 | 74 | 8 |
| 8 | 64 | BMA, 16 | GMA, 1.0 | IBN, 0.2 | BF, 80; TF, 25 | 75 | 12 |
| 9 | 128 | BMA, 32 | GMA, 3.8 | IBN, 0.2 | BF, 160; TF, 50 | 74 | 8 |
| 10 | 128 | EHMA, 32 | GA, 3.8 | IBN, 0.2 | BF, 160; TF, 50 | 74 | 15 |

(a) Fluoromonomer in all cases, $CH_2=C(CH_3)CO_2CH_2CH_2R_f$; $R_f=n-C_6F_{13}$, $n-C_8F_{17}$ and $n-C_{10}F_{21}$ in weight ratio 3:2:1, containing less than 10% of $nC_{12}F_{25}$ and $nC_{14}F_{29}$.
(b) BMA=Butyl methacrylate; MAM=N-methylol acrylamide; EHMA=2-ethylhexyl methacrylate; GMA=Glycidyl methacrylate; GA=Glycidyl acrylate; HPMA=2-hydroxypropyl methacrylate.
(c) IBN=Azobis(isobutyronitrile).
(d) BF=$CFCl_2CFCl_2$; TF=$CF_2ClCFCl_2$; EtOAc=Ethyl acetate.

TABLE I.—PRODUCT PROPERTIES

| Ex. No. | Inherent viscosity 30° C., 0.5% in $CF_2ClCFCl_2$ | Percent C | Percent H | Percent F | Solubility At least 10% weight | At least 1% weight |
|---|---|---|---|---|---|---|
| 2 | 0.37 | 40.4(39.3) | 3.7 | 45.0 | $CF_2ClCFCl_2$, $CFCl_2CFCl_2$, $CHCl=CCl_2$ | |
| 3 | 0.43 | 40.5(39.3) | 3.9(3.5) | 45.0(45.6) | Same as above | |
| 4 | 0.42 | 39.5(38.5) | 3.4(3.4) | 48.7(47.3) | $CF_2ClCFCl_2$, $CFCl_2CFCl_2$, $CCl_2=CHCl$. $CFCl_2CFCl_2$, $CF_2ClCFCl_2CHCl=CCl_2$. $CF_2ClCRCl_2m CHCl=CCl_2$ | $CH_3CCl_3CCl_2=CCl_2$ |
| 5 | | | | | | |
| 6 | | | | | | |
| 7 | 0.49 | 33.3(32.7) | 2.1(2.1) | 57.0(57.1) | 1/1 $CF_2ClCFCl_2/CFCl_2CFCl_2$ | $CF_2ClCFCl_2$ |
| 8 | 0.33 | 39.4(38.5) | 3.5(3.4) | 46.6(47.3) | $CF_2ClCFCl_2$, $CFCl_2CFCl_2CHCl=CCl_2$ | |
| 9 | 0.42 | 39.6(38.9) | 3.6(3.4) | 46.8(46.9) | Same as above | |
| 10 | | 39.0(39.0) | 3.4 2-6 | 48.1(46.8) | do | |

EXAMPLE 11

A mixture of 44.2 parts of dimethyloctadecylamine and 27.1 parts glacial acetic acid was prepared, combined with 2137 parts water and agitated until mixing was complete. Then 1472 parts of $F(CF_2)_nCH_2CH_2O_2CC(CH_3)=CH_2$, wherein n is 6, 8 and 10 in the approximate weight ratio of 3:2:1 containing also approximately 10% by weight of n=12–14, were added to the aqueous mixture with agitation and recycled through a centrifugal pump for approximately 30 minutes. The mixture was then pumped through a Manton-Gaulin homogenizer under a pressure of approximately 7,000 pounds. This mixture was then purged with nitrogen for about one hour. In a separate vessel, 1650 parts water were heated under reflux to remove air and then the homogenized mixture prepared above was added. A solution of 0.15 part lauryl mercaptan in 29.4 parts n-butyl acrylate was added followed by 12.3 parts of a 60% aqueous solution of N-methylolacrylamide. The temperature of the resulting mixture was adjusted to 60° C. and 0.59 part of azobis(isobutyramidine dihydrochloride) was added. The resulting charge was maintained at about 60° C. with agitation until the initial exothermic reaction subsided. The temperature was increased to 70° C. and the reaction mixture was maintained at 70° C. for about four hours. The conversion of monomer was approximately 99.4% and the resulting polymer dispersion is free of any precoagulum.

EXAMPLES 12–13

Using the procedure of Example 11 the polymerizations shown in Table II which follows were carried out. In each case the monomer or monomers were dispersed in water as in Example 11, the indicated initiator was added and the reaction mixture was heated with agitation for the indicated length of time. The polymers were isolated as before.

TABLE II

| Ex. No. | Fluoromonomer, parts a | Comonomer A, parts b | Comonomer B, parts b | Initiator, parts c | Solvent | Temp. |
|---|---|---|---|---|---|---|
| 12 | 98 | BuA, 2 | MAM, 0.25 | IBH | $H_2O$ | 74 |
| 13 | 97.5 | BuA, 2 | MAM, 0.5 | IBH | $H_2O$ | 74 | a See footnote (a), Table I.
b See footnote (b), Table I., BuA=butyl acrylate.
c IBH=azobis(isobutyramidinedihydrochloride).

The following examples illustrate the application of the compositions of this invention to textile fabrics. In these examples the solution is uniformly sprayed over a fabric until a wet pickup of 30–140% based on the weight of fabric is attained. Depending on the concentration of vide from 0.1% to 10% and preferably 0.5 to 1% total solids on the fabric. The spraying apparatus used was a commercially available device which subjects the spraying liquid to a hydrostatic head of pressure without coming into contact with air. The solvent is allowed to evaporate and the dry fabric is cured by heating, generally for about 60 seconds at the temperatures indicated. The cured fabrics were evaluated for oil and water repellency both before and after being subjected to standard dry cleaning procedures.

The treated fabric samples were evaluated for water repellency using A.A.T.C.C. Standard Test Method 22–1952 of the American Association of Textile Chemists and Colourists. A rating of 100 denotes no water penetration or surface adhesion, a rating of 90 denotes slight random sticking or wetting and so on.

The oil repellency test comprises placing a drop of test solution carefully on the textile on a flat horizontal surface. After three minutes, any penetration or wicking into the fabric is noted visually. The nature of the test solution is shown below; Nujol, of course, is a purified petroleum oil. Anything with a rating of 5 or greater is good or excellent, anything with a rating of 2 or over can be used for certain purposes. As an example, if treated fabric repels the No. 2–6 solutions but not the No. 7 solution, its rating is 6.

| Test solution | Surface tension, dynes/cm. at 25° C. |
|---|---|
| Oil repellency rating: | |
| 9 ........................... n-Heptane .................. | 20.0 |
| 8 ........................... n-Octane .................... | 21.8 |
| 7 ........................... n-Decane .................... | 23.5 |
| 6 ........................... n-Dodecane ................. | 25.0 |
| 5 ........................... n-Tetradecane .............. | 26.7 |
| 4 ........................... 50-50 hexadecane-Nujol .... | 28.7 |
| 3 ........................... 25-75 hexadecane-Nujol .... | 30.3 |
| 2 ........................... Nujol ....................... | 31.2 |

As the fabrics for which this invention is intended are sensitive to water and cannot tolerate laundering, no laundering tests were carried out. Dry cleaning durability was tested as follows: A standard dry cleaning consists of agitating the sample 20 minutes in tetrachloroethylene containing 1.5% (weight/volume) of a commercial dry cleaning detergent (R. R. Street Co., 886 Detergent), extraction with tetrachloroethylene, drying for three minutes at 66° C. in a drum and followed by a 15 second pressing at 149° C. on each side of the fabric.

EXAMPLE 14

This example represents the presently preferred species of the invention. A 7.5% solution of the polymer of Example 1 was dissolved in a mixture consisting of 80% by weight 1,1,2-trichlorotrifluoroethane and 20% by weight 1,2-difluorotetrachloroethane. A 14% solution by weight in trichloroethylene was prepared of a chlorosulfonated polyethylene, melamine derivative and paraffin wax in the weight ratio of 20:27:15. To trichloroethylene was added 1/40 its volume of the fluoropolymer solution and 1/40 its volume of the other solution. The resulting solution, containing 0.5% by weight dissolved solids, was sprayed onto samples of cotton poplin and rayon upholstery fabric to provide 140% wet pickup and 0.7% by weight solids on weight of fabric. After evaporation of the solvent, the fabric samples were heated at 149° C. for 60 seconds. Evaluation by the methods indicated above gave the following results:

| Fabric: | Repellency initial | | 1 standard wash | | 1 standard dry cleaning | |
|---|---|---|---|---|---|---|
| | Oil | Water | Oil | Water | Oil | Water |
| Cotton poplin | 6 | 100 | 5 | 90 | 4 | 80 |
| Rayon | 6 | 80 | 5 | 80 | 5 | 80 |

In the above example, the chlorosulfonated polyethylene contains 29% chlorine and 1.3% sulfur and is prepared by the method described in U.S. Pat. 2,586,363. The melamine derivative is prepared by reaction of one part hexamethoxymethyl melamine with three parts stearic acid using the procedure of U.S. Pat. 2,398,569.

EXAMPLE 15

A 1% total solids solution in trichloroethylene was prepared. The solids had the following composition: 17% by weight of fluorinated polymer of Example 2, 17% by weight of fluorinated polymer of Example 4, 25% by weight melamine derivative (C) of Table III, 14% wax, 8% copolymer containing 70% stearyl methacrylate, 30% diethylaminoethylmethacrylate and 19% terpolymer containing 74% ethylene, 22% vinyl acetate and 4% methacrylyl chloride. This solution was sprayed onto cotton poplin and rayon upholstery fabric in the same manner as in Example 1 to obtain 0.6% total solids on fabric. After evaporation of the solvent and curing at 149° C. for 60 seconds, the fabrics were evaluated as previously described. The results are indicated below.

| Fabric: | Repellency initial | |
|---|---|---|
| | Oil | Water |
| Cotton poplin | 6 | 90 |
| Rayon | 5 | 80 |

EXAMPLES 16–30

These examples were carried out in the same manner as Example 13. In Tables III and IIIa which follow are given the formulations, curing times and temperatures, fabrics and concentrations of solids on fabric and the repellency results obtained.

TABLE III.—CONDITIONS

| Example No.: | Fluorinated polymer of | Percent | Melamine derivative, percent [a] | Weight of wax, percent [b] | Solids extender polymer, percent [c] | Stock solution percent solids solvent [d] | Spraying solution percent solids solvent [e] | Cure °C. | Sec. |
|---|---|---|---|---|---|---|---|---|---|
| 16 | Ex. 1 | 37 | C, 24 | 14 | C, 1 ...... 16 ......<br>D, 8 ...... 80% TC<br>.......... 20% TF | 1 TC | [a] 93<br>[b] 121<br>[c] 149<br>[d] 177 | 60<br>60<br>60<br>90 |
| 17 | Ex. 7 | 38 | C, 28 | 15 | C, 19 ...... 3 ......<br>.......... 50% BF<br>.......... 50% TF | 0.5 TF | 149 | 60 |
| 18 | Ex. 8 | 35 | C, 25 | 14 | B, 18 ...... 12 ......<br>D, 8 ...... 70% TC<br>.......... 3% BF<br>.......... 27% TF | 0.5 TC | 149 | 60 |
| 19 | Ex. 9 | 38 | C, 27 | 15 | B, 20 ...... 3.2<br>.......... 2% BF<br>.......... 20% TF<br>.......... 78% TC | 0.5 TC | 149 | 60 |
| 20 | Ex. 5 | 14 | {A, 34<br>{B, 34 | 17 | 16, TF | 0.8 TC | 180 | 60 |
| 21 | Ex. 6 | 14 | {A, 34<br>{B, 34 | 18 | 15, TF | 1.4 TC | 180 | 60 |
| 22 | Ex. 12 | 38 | C, 27 | 15 | A, 20 | 1.7 TF | 149 | 60 |
| 23 | Ex. 13 | 38 | C, 27 | 15 | A, 20 | 1.1 TF | 149 | 60 |
| 24 | Ex. 11 | 25 | C, 36 | 17 | {A, 11<br>{D, 11 | 0.7 TF | {[a] 149<br>{[b] 21 | 60<br>60 |
| 25 | {Ex. 11<br>{Ex. 4 | 21<br>21 | C, 31 | 17 | D, 10 ...... 14<br>.......... 90% TF<br>.......... 10% TC | 1.2 TF | {[c] 149<br>{[b] 82 | 60<br>66 |
| 26 | {Ex. 11<br>{Ex. 4 | 19<br>19 | C, 23 | 15 | A, 21 | 2.1 TF | 82 | 60 |
| 27 | Ex. 11 | 37 | C, 27 | 15 | C-2, 21 | 1.9 TF | 149 | 60 |
| 28 | Ex. 10 [1] | 38 | C, 27 [2] | 15 | D, 20 | 1.9 TF | 149 | 60 |

See footnotes at end of table.

TABLE III—Continued

| | Fluorinated polymer of | Percent | Melamine derivative, percent [a] | Weight of wax, percent [b] | Solids extender polymer, percent [c] | Stock solution percent solids solvent [d] | Spraying solution percent solids solvent [e] | Cure °C. | Sec. |
|---|---|---|---|---|---|---|---|---|---|
| 29 | Ex. 1 | 37 | C, 24 | 14 | {C-1, 17; D, 8} | 16 (TC/TF=4/1) | 0.5 TC | 177 | 60 |
| 30 | Ex. 2 | 50 | | | B, 50 | | 1.0 TC | 149 | 60 |

[1] As 7.5% soln. in TF.
[2] As 14% soln. in TC.

[a] Melamine derivatives:
  A = Hexamethoxymethylmelamine.
  B = Reaction product of one part hexamethoxymethylmelamine with three parts stearic acid according to U.S.P. 2,398,569.
  C = Reaction product of one part hexamethoxymethylmelamine with two parts behenic acid according to the process of U.S.P. 2,398,569.
  D = A partial reaction product of melamine and formaldehyde (Aerotex M23 resin, American Cyanamid).
  E = A mixture of 25% wax and 75% of a reaction product of hexamethoxymethylmelamine with stearic acid and triethanolamine and neutralized with acetic acid, prepared according to Example 1 of U.S.P. 2,783,231 (Phobotex F/T/C resin—Ciba).

[b] Paraffin wax, Atlantic Wax 115.

[c] Extender polymer—A-Terpolymer of 74% ethylene, 22% vinyl acetate and 4% methacrylyl chloride.
  B = Chlorosulfonated polyethylene containing 29% chlorine and 1.3% sulfur, prepared from polyethylene of density 0.92 by the procedure of U.S.P. 2,586,363.
  C-1 A polyurethane prepared according to the procedures of U.S.P. 2,929,800 by reaction of one mole of polytetramethylene ether glycol, number average molecular weight 1000, with 1.67 moles of 2,4-toluene diisocyanate.
  C-2 A polyurethane similar to C-1 prepared from two moles of 2,4-toluene diisocyanate.
  C-3 A polyurethane prepared according to the procedures of U.S.P. 2,929,800 by reaction of one mole polytetramethylene ether glycol number average molecular weight 1000, one mole 1,3-butanediol and four moles of a mixture of isomeric toluene diisocyanates (80% 2,4-; 20% 2,6-).
  D A copolymer of 70% stearyl methacrylate/30% diethylaminoethyl methacrylate prepared according to Example 1 of British Patent 915,759.

[d] Solvents:
  TC = trichloroethylene.
  TF = 1,1,2-trichlorotrifluoroethane.
  BF = 1,2-difluorotetrachloroethane.

[e] Solvent used to dilute stock solution or to prepare spray solution directly, abbreviated same as footnote [d].

TABLE IIIa.—RESULTS

| | Fabric | Percent solids OWF | Initial Oil | Initial Water | 1 Dry Cleaning Oil | 1 Dry Cleaning Water |
|---|---|---|---|---|---|---|
| Example No.: | | | | | | |
| 16 | (a) Poplin | 0.6 | 6 | 90 | 6 | 80 |
| | Rayon | 0.6 | 5 | 80 | 5 | 70 |
| | (b) Poplin | 0.6 | 5 | 100 | 5 | 80 |
| | Rayon | 0.6 | 5 | 80 | 5 | 70 |
| | (c) Poplin | 0.6 | 6 | 100 | 5 | 80 |
| | Rayon | 0.6 | 6 | 90 | 5 | 70 |
| | (d) Poplin | 0.6 | 6 | 100 | 6 | 80 |
| | Rayon | 0.6 | 6 | 90 | 6 | 80 |
| 17 | Poplin | 0.66 | 7 | 100 | 5 | 80 |
| | Rayon | 0.66 | 7 | 100 | 4 | 80 |
| 18 | Poplin | 0.67 | 5 | 100 | 6 | 70 |
| | Rayon | 0.67 | 5 | 80 | 6 | 50 |
| 19 | Poplin | 0.74 | 5 | 100 | 6 | 90 |
| | Rayon | 0.74 | 6 | 80 | 6 | 50 |
| 20 | Poplin | 0.56 | 6 | 50 | | |
| | | 0.78 | 6 | 70 | | |
| 21 | Poplin | 0.32 | 6 | 50 | | |
| | | 0.64 | 6 | 70 | | |
| 22 | Poplin | 0.61 | 6 | 80 | 6 | 80 |
| | Rayon | 0.61 | 7 | 100 | 6 | 80 |
| 23 | Poplin | 0.79 | 7 | 100 | 7 | 100 |
| | Rayon | 0.79 | 6 | 100 | 6 | 90 |
| 24 | Rayon | 0.83 | 7 | 100 | 7 | 80 |
| | do | 0.83 | 7 | 80 | 7 | 80 |
| 25 | Rayon | 0.90 | 6 | 100 | 6 | 80 |
| | 50% Rayon, 50% Polypropylene | 0.7 | 6 | 100 | 7 | 80 |
| 26 | Poplin | 0.75 | 7 | 100 | 7 | 90 |
| | Rayon | 0.75 | 7 | 100 | 7 | 80 |
| 27 | Poplin | 0.66 | 7 | 100 | | |
| | Rayon | 0.66 | 7 | 90 | | |
| 28 | Poplin | 0.49 | 6 | 100 | 7 | 90 |
| | Rayon | 0.49 | 8 | 80 | 5 | 50 |
| 29 | A | 0.5 | 6 | 80 | 6 | 50 |
| | B | 0.6 | 6 | 70 | 6 | 70 |
| | C | 0.6 | 6 | 70 | 6 | 70 |
| | D | 0.6 | 6 | 90 | 6 | 90 |
| | E | 0.8 | 6 | 80 | 6 | 80 |
| | F | 0.8 | 6 | 100 | 7 | 90 |
| | G | 0.9 | 6 | 70 | 6 | 70 |
| 30 | Cotton | 0.78 | 5 | 100 | 5 | 90 |
| | Rayon | 0.78 | 6 | 80 | 0 | 80 |

NOTE:
A = 39% Cotton, 38% Spunrayon, 23% Filament Rayon.
B = 44% Cotton, 32% Spunrayon, 24% Filament Rayon.
C = Same as B.
D = 100% Spunrayon.
E = 45% Spunrayon, 28% Cotton, 27% Filament Rayon.
F = Same as D.
G = 70% Spunrayon, 30% Filament Rayon.

EXAMPLE 31

A mixture of solids was prepared containing 32% by weight fluoro copolymer of Example 2, 32% by weight copolymer of Example 9, 23% by weight of melamine derivative A of Table II and 13% by weight wax. A 0.4% by weight solution of this solid mixture was prepared in a mixture of chlorofluoro carbons of the following composition:

3% 1,2-difluorotetrachloroethane, 3% 1,1,2-trichlorotrifluoroethane, 46.8% trichloromonofluoromethane, and 46.8% dichlorodifluoromethane. This solution was placed in an aerosol container equipped with an 0.018/0.0180 precision valve and 0.018 actuator. The aerosol solution was sprayed on cotton poplin and rayon pile fabrics to obtain a 0.7% OWF loading after evaporation of the solvent. No heat curing was used. The oil and water repellencies were tested using the method described initially and after one standard dry cleaning. The results were as follows:

|  | Repellency | | | |
| --- | --- | --- | --- | --- |
|  | Initial | | After dry cleaning | |
|  | Oil | Water | Oil | Water |
| Fabric: | | | | |
| Cotton | 6 | 100 | 7 | 80 |
| Rayon | 7 | 90 | 7 | 70 |

EXAMPLE 32

(A) A 5% by weight solution in trichlorotrifluoroethane was prepared wherein the dissolved solids consisted of 45.8% fluoropolymer of Example 1 and 54.2% wax. This solution was diluted to 0.5% total solids concentration with trichloroethylene and applied to cotton poplin according to the procedure previously described. After curing at 140° C. for 60 seconds the treated poplin was evaluated for oil and water repellency with the following results:

|  | Repellency | |
| --- | --- | --- |
|  | Oil | Water |
| Percent solids OWF: | | |
| 0.38 | 2 | 50/0 |
| 0.76 | 2 | 80 |
| 1.114 | 2 | 90 |

It is apparent from this Example 32–A that reasonable water repellencies can be obtained by high concentrations on fabric but that useful oil repellencies are not obtained.

(B) Three copolymers were prepared as follows:

($A$) 16.0 grams $F(CF_2)_nCH_2CH_2O_2CC(CH_3)=CH_2$, $n=6$, 8 and 10 in weight ratio 3:2:1, 24 grams n-butyl methacrylate and 2 g. $CH_2=CHCONHCH_2OCH_3$ were copolymerized at 75° C. for 21 hours using azobisisobutyronitrile initiator, then 100 ml. of trichloroethylene was added. The solution contained 19.6% solid polymer.

($B$) 16.0 grams of the fluorinated monomer of part A, 22 g. n-butyl methacrylate and 2.0 g. methacrylic acid in 35 ml. ethyl acetate were copolymerized at 75° C. for 22 hours with azobisisobutyronitrile initiator. The resulting mixture was diluted with 100 ml. trichloroethylene; the solution contained 18.5% solids.

($C$) The polymerization of part B was repeated using 16.0 g. of the fluorinated monomer, 20 g. n-butylmethacrylate and 4.0 g. methacrylic acid and 50 ml. ethyl acetate. The resulting solution contained 19.5% solids.

Six solutions, listed 1 through 6 below, were then prepared by adding to the amounts of the ingredients listed below, 100 ml. of trichloroethylene:

|  | Hexamethoxymethylmelamine, g. | Condensation product of 2 moles behenic acid plus 1 mole of hexamethoxymethylmelamine, g. |
| --- | --- | --- |
| Solution: | | |
| 1 | 5.0 | |
| 2 | 4.0 | 1.0 |
| 3 | 3.0 | 2.0 |
| 4 | 2.0 | 3.0 |
| 5 | 1.0 | 4.0 |
| 6 |  | 5.0 |

A series of pad baths were prepared by first diluting 16.0 g. of the fluorinated polymer solution ($A$) above with 50 ml. trichloroethylene. Then six portions of this diluted polymer solution were combined with each of solutions 1 to 6 above in a ratio of 80% solids of solutions 1–6 and 20% solids of polymer ($A$). A similar series of six were prepared containing 90% solids of solutions 1–6 and 10% solids of polymer ($A$). Each of these resulting solutions was diluted with trichloroethylene to contain 2% solids total.

A second series of twelve baths were prepared from solutions 1–6 and the solution of polymer ($B$) (16.9 g.) diluted with 50 ml. trichloroethylene. One ml. ethanol per 25 ml. final solution was added.

A third series of twelve baths were prepared from solutions 1–6 and the solution of polymer ($C$) (16.0 g.) diluted with 50 ml. trichloroethylene. One ml. ethanol per 25 ml. final solution was added.

Each of the 36 baths was applied to cotton at 100% wet pickup, dried and cured for 2 minutes at 185° C.; 0.15 ml. of a melamine-formaldehyde condensate curing catalyst was added to each bath just before use. The cured cotton was tested for oil and water repellency using the methods described in the above-identified application, with the following results:

|  | Fluorinated polymer type | Percent on wt. of solids | Oil repellency | Water repellency |
| --- | --- | --- | --- | --- |
| Solution: | | | | |
| 1 | A | 20 | 2 | 50 |
|  | A | 10 | 2 | 50 |
| 2 | A | 20 | 2 | 50 |
|  | A | 10 | 2 | 50 |
| 3 | A | 20 | 4 | 50 |
|  | A | 10 | 4 | 50 |
| 4 | A | 20 | 5 | 50 |
|  | A | 10 | 5 | 50 |
| 5 | A | 20 | 5 | 50 |
|  | A | 10 | 5 | 50 |
| 6 | A | 20 | 5 | 50 |
|  | A | 10 | 5 | 50 |
| 1 | B | 20 | 1 | 70 |
|  | B | 10 | 1 | 70 |
| 2 | B | 20 | 1 | 70 |
|  | B | 10 | 1 | 70 |
| 3 | B | 20 | 2 | 70 |
|  | B | 10 | 2 | 70 |
| 4 | B | 20 | 1 | 70 |
|  | B | 10 | 2 | 70 |
| 5 | B | 20 | 4 | 70 |
|  | B | 10 | 4 | 70 |
| 6 | B | 20 | 3 | 70 |
|  | B | 10 | 3 | 70 |
| 1 | C | 20 | 1 | 70 |
|  | C | 10 | 1 | 70 |
| 2 | C | 20 | 1 | 70 |
|  | C | 10 | 1 | 70 |
| 3 | C | 20 | 1 | 70 |
|  | C | 10 | 1 | 70 |
| 4 | C | 20 | 1 | 70 |
|  | C | 10 | 1 | 70 |
| 5 | C | 20 | 1 | 70 |
|  | C | 10 | 1 | 70 |
| 6 | C | 20 | 1 | 70 |
|  | C | 10 | 1 | 70 |

(C) ($A$) A mixture of 28 g. fluorinated monomer $F(CF_2)_nCH_2CH_2O_2CC(CH_3)=CH_2$ (as described in Experiment 1), 12 g. n-butyl methacrylate, 30 ml. ethyl acetate and 0.05 azobisisobutyronitrile was heated at 75°

C. for 13 hours. The resulting mixture was diluted with 100 ml. trichloroethylene, giving a solution containing 17.5% polymer solids. 20.4 g. of this solution was then diluted with 100 ml. trichloroethylene.

(B) Three solutions were prepared, each containing 2.0 g. hexamethoxy-methylmelamine and 3.0 g. of another melamine derivative, and 100 ml. of trichloroethylene, as follows:

Solution 1: reaction product of one mole hexamethoxy-methylmelamine with one mole 97% stearic acid.
Solution 2: reaction product of one mole hexamethoxy-methylmelamine with 2.5 moles 97% stearic acid.
Solution 3: reaction product of one mole hexamethoxy-methylmelamine with three moles 97% stearic acid.

Three baths were prepared containing 2% solids, the solids being 20% of the polymer prepared in (A) and 80% the solids of solutions 1–3.

Three other baths were prepared containing 2% solids, the solids being 10% of the polymer prepared in (A) and 90% of the solids of solutions 1–3. To each bath was added 0.15 ml. catalyst 1010 just before use.

Each bath was applied to cotton at 100% pickup, dried and cured as in Experiment 1. Oil and water repellencies were evaluated initially and after three launderings or dry cleanings as described in the above-identified application. The results are shown below:

| | Percent polymer A in solids | Repellencies | | | | | |
|---|---|---|---|---|---|---|---|
| | | Initial | | 3 Launderings | | 3 Dry cleanings | |
| | | Oil | Water | Oil | Water | Oil | Water |
| Solution: | | | | | | | |
| 1 | 20 | 5 | 80+ | | | 1 | 50 |
| | 10 | 4 | 90 | 0 | 0 | | |
| 2 | 20 | 6 | 100 | 0 | 50 | | |
| | 10 | 6 | 100 | | | 1 | 70 |
| 3 | 20 | 6 | 100 | | | 1 | 70 |
| | 10 | 6 | 100 | 1 | 50 | | |

(D) A solution was prepared consisting of:

Hexamethoxy-methylmelamine—3.4 g.
Melamine derivative—5.1 g.
Trichloroethylene—150 ml.
Catalyst 1010—0.255 ml.
Fluorinated polymer solution prepared in part (A) of Experiment C—12.25 g.

This solution was diluted to 200 ml. with trichloroethylene (5% active ingredients).

The melamine derivative was prepared by reaction of 218 g. 97% stearic acid with 103.6 g. hexamethoxy-methylmelamine.

Cotton fabric was sprayed with the solution under conditions which deposited 0.286% active ingredients per pass. The fabric was cured as described in Experiment 1 and tested as described in Experiment C. The results are shown below:

| | Solids percent OWF | Repellencies | | | | | |
|---|---|---|---|---|---|---|---|
| | | Initial | | 3 Launderings | | 3 Dry cleanings | |
| | | Oil | Water | Oil | Water | Oil | Water |
| Passes through spray: | | | | | | | |
| 1 | 0.3 | 0 | 0 | | | | |
| 2 | 0.6 | 1 | 70 | | | | |
| 3 | 0.9 | 3 | 70 | | | | |
| 4 | 1.2 | 3 | 80 | 1 | 0 | | |
| 5 | 1.5 | 4 | 80 | | | 1 | 50 |
| 6 | 1.8 | 4 | 80 | 1 | 0 | | |
| 7 | 2.1 | 5 | 80+ | | | 1 | 50 |

It is apparent from Examples 32–C and 32–D that useful, durable oil and water repellencies were not obtained from the compositions employed therein.

EXAMPLE 33

A reaction vessel was charged with 64 parts fluoromonomer of Example 1, 16 parts butylmethacrylate and 4 parts glycidyl methacrylate. A mixture of 80 parts tetrachlorodifluoroethane, 25 parts trichlorotrifluoroethane and 0.1 part lauryl mercaptan was added. After degassing with nitrogen for 30 minutes, 0.1 part of azobisisobutyronitrile was added and the mixture was heated at 74° C. for three hours. A further 0.1 part of the azonitrile was then added and heating was continued at 74° C. for 11 hours. The resulting polymer had an inherent viscosity of 0.15 as a ½% solution in trichlorotrifluoroethane at 30° C. Analysis indicated that conversion of monomers was essentially complete.

A mixture of solids containing 38% by weight of the above polymer, 27% by weight of melamine derivative C of Table III, 15% wax and 20% extender polymer B of Table III was prepared and dissolved in trichloroethylene to form a 0.5% solution. This solution was sprayed on cotton poplin and rayon in the manner previously described to obtain a loading of 0.67% OWF. After curing for 60 seconds at 154° C. the fabric samples were evaluated for oil and water repellency both initially and after one dry cleaning with the results shown below.

| | Repellency | | | |
|---|---|---|---|---|
| | Initial | | One Dry Cleaning | |
| | Oil | Water | Oil | Water |
| Fabric: | | | | |
| Poplin | 5 | 100 | 4 | 100 |
| Rayon | 6 | 80 | 6 | 70 |

EXAMPLE 34

Using the procedure of Example 33, a polymer was prepared using the following recipe:

| | Parts |
|---|---|
| Fluoromonomer of Example 1 | 16 |
| n-Butylmethacrylate | 16 |
| Glycidyl methacrylate | 4 |
| Lauryl mercaptan | 0.4 |
| Tetrachlorodifluoroethane | 80 |
| Trichlorotrifluoroethane | 25 |
| Azobisisobutyronitrile | 0.2 |

The resulting polymer had an inherent viscosity of 0.08 as a ½% solution in trichlorotrifluoroethane at 30° C. A 0.5% solution of solids consisting of 38% of this polymer, 27% melamine derivative C, 15% wax and 20% extender polymer B was prepared and sprayed onto cotton poplin and rayon by the previously described method to obtain 0.65% loading OWF. After curing at 154° C. for 60 seconds the fabric samples were evaluated as before with the following results:

| | Repellency | | | |
|---|---|---|---|---|
| | Initial | | One Dry Cleaning | |
| | Oil | Water | Oil | Water |
| Fabric: | | | | |
| Poplin | 5 | 100 | 6 | 80 |
| Rayon | 6 | 80 | 6 | 70 |

As noted in the present specification and the preceding representative examples, significant results are attained as long as either the melamine formaldehyde condensation product or the nonfluorinated extender polymer is present in a minimum amount of 3%; the wax component is, of course, optional and the organic solvent, as described, must be present.

The preceding representative examples may be varied within the scope of the present total specification disclosure as understood and practiced by one skilled in the art, to achieve essentially the same results.

19

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are as follows:

1. A composition comprising
   (I) from 0.5 to 50% by weight of solids comprising
      (A) from 5% to 97% by weight based on total weight of solids of a fluorinated copolymer comprising
         (a) from about 25% to about 99% of recurring units derived from monomers of the structure $R_fCH_2CH_2O_2CC(CH_3)=CH_2$ wherein $R_f$ is a perfluoroalkyl group of from four to fourteen carbons;
         (b) from 0.1% to about 20% by weight of recurring units derived from at least one monomer selected from $$CH_2=C(R)CO_2R'OH,$$
         $$CH_2=C(R)CONHCH_2OH \text{ or}$$
         $$CH_2=C(R)CO_2R''$$

wherein R is hydrogen or methyl, R' is alkylene of at least two carbons and R" is epoxy alkyl of at least three carbons; and
         (c) recurring units derived from at least one vinylidene monomer free of nonvinylic fluorine different from said monomers of said (b) in an amount sufficient to make the total percent by weight of (a), (b) and (c) 100 percent;
      (B) from 3% to 75% of at least one nonfluorinated extender polymer chosen from the group consisting of (1) copolymers of long chain alkyl methacrylates and dialkylaminoalkyl methacrylates, (2) chlorosulfonated hydrocarbon polymers, (3) polyurethanes containing free isocyanate groups, and (4) copolymers containing the group

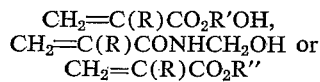

R being H or methyl;
   (II) from 50% to 99.5% based on the weight of the total composition, of an organic solvent chosen from the group consisting of hydrocarbons, halogenated hydrocarbons, ketones and esters having a boiling point of from about 25° C. to 180° C.;
said polymers of said (I)(A) and (I)(B) each being soluble in said organic solvent to the extent of from 0.03% to 20% by weight based on weight of the solvent.

2. A composition according to claim 1 wherein
the monomers of part (I)(A)(a) are those in which $R_f$ is $C_6F_{13}$, $C_8F_{17}$ and $C_{10}F_{21}$ in the weight ratio of about 3:2:1;
the monomers of part (I)(A)(b) are selected from hydroxyalkyl acrylates, hydroxyalkyl methacrylates, hydroxyalkyl acrylamides, hydroxyalkyl methacrylamides, epoxyalkyl acrylates, or epoxyalkylmethacrylates;
the monomers of part (I)(A)(c) are selected from alkyl acrylates, alkyl methacrylates, styrene, alkyl styrene, vinyl alkyl ketones, vinyl alkyl ethers, vinyl esters of aliphatic acids, butadiene or substituted butadienes;
the nonfluorinated extender polymer of part (I)(B) is selected from the terpolymer of ethylene, vinyl acetate and methacrylyl chloride; the copolymer of stearyl methacrylate and diethylaminoethyl methacrylate, chlorosulfonated polyethylene, or polyurethane rubber copoymer; and
the solvent of part (II) is selected from trichloroethylene, tetrachloroethylene, 1,1,2 - trichlorotrifluoroethane or 1,2-difluorotetrachloroethane.

3. A composition according to claim 1 wherein
the monomers of part (I)(A)(a) are those in which $R_f$ is $C_6F_{13}$, $C_8F_{17}$ and $C_{10}F_{21}$ in the weight ratio of about 3:2:1;
the monomer of part (I)(A)(b) is glycidyl methacrylate;
the monomer of part (I)(A)(c) is n-butylmethacrylate;
the nonfluorinated extender polymer of part (I)(B) is chlorosulfonated polyethylene; and
the solvent of part (II) is a mixture of 1,1,2-trichlorotrifluoroethane, 1,2-difluorotetrachloroethane and trichloroethylene.

4. A composition according to claim 1 containing up to 50% by weight of solids of a wax; the total of said components (I)(A), (I)(B), and wax, when all present, being 100% by weight of solids.

5. A composition according to claim 1 wherein the monomers defined in part (I)(A)(a), $R_f$ is $C_6F_{13}$, $C_8F_{17}$ and $C_{10}F_{21}$ in the weight ratio of about 3:2:1.

References Cited

UNITED STATES PATENTS

| | | | |
|---|---|---|---|
| 2,642,416 | 6/1953 | Ahlbrecht et al. | 260—86.1 |
| 2,913,427 | 11/1959 | Michaels | 260—28.5 |
| 3,068,187 | 12/1962 | Bolstad et al. | 260—33.8 |
| 3,087,905 | 4/1963 | Fluck | 260—853 |
| 3,252,932 | 5/1966 | Bolstad et al. | 260—853 |
| 3,256,230 | 6/1966 | Johnson et al. | 260—900 |
| 3,277,039 | 10/1966 | Marascia et al. | 260—900 |
| 3,282,905 | 11/1966 | Fasick et al. | 260—89.5 |
| 3,378,609 | 4/1968 | Fasick et al. | 260—900 |
| 3,330,812 | 7/1967 | Smith et al. | 260—33.8 |
| 3,393,186 | 7/1968 | Groves | 260—86.1 |

FOREIGN PATENTS 1,356,923  2/1964  France.

MORRIS LIEBMAN, Primary Examiner

P. R. MICHL, Assistant Examiner

U.S. Cl. X.R.

260—32.8, 33.6, 33.8, 853, 859, 900